United States Patent [19]

Filliman

[11] 4,271,409

[45] Jun. 2, 1981

[54] APPARATUS FOR CONVERTING DIGITAL DATA INTO A VIDEO SIGNAL FOR DISPLAYING CHARACTERS ON A TELEVISION RECEIVER

[75] Inventor: Paul D. Filliman, Fort Wayne, Ind.

[73] Assignee: The Magnavox Company, Knoxville, Tenn.

[21] Appl. No.: 907,373

[22] Filed: May 19, 1978

[51] Int. Cl.³ .............................................. G06F 3/14
[52] U.S. Cl. .................................... 340/703; 340/811; 358/16; 358/23
[58] Field of Search ...................... 340/703, 811, 814; 358/16, 23, 82

[56] References Cited

U.S. PATENT DOCUMENTS

| | | | |
|---|---|---|---|
| 3,877,009 | 4/1975 | Kanie | 340/703 |
| 3,886,588 | 5/1975 | Dalke | 358/82 |
| 3,909,818 | 9/1975 | Dalke et al. | 340/703 |
| 4,117,509 | 9/1978 | de Boer | 358/16 |

Primary Examiner—Marshall M. Curtis
Attorney, Agent, or Firm—Thomas A. Briody; William J. Streeter

[57] ABSTRACT

Apparatus is described for converting the digital output of a microprocessor system into a video signal. The video signal is thereafter applied to a television receiver to cause objects described and controlled by a microprocessor system to be displayed on the television receiver. The apparatus is specifically used to provide an interface between a microprocessor controlled video game and a television monitor or receiver.

3 Claims, 3 Drawing Figures

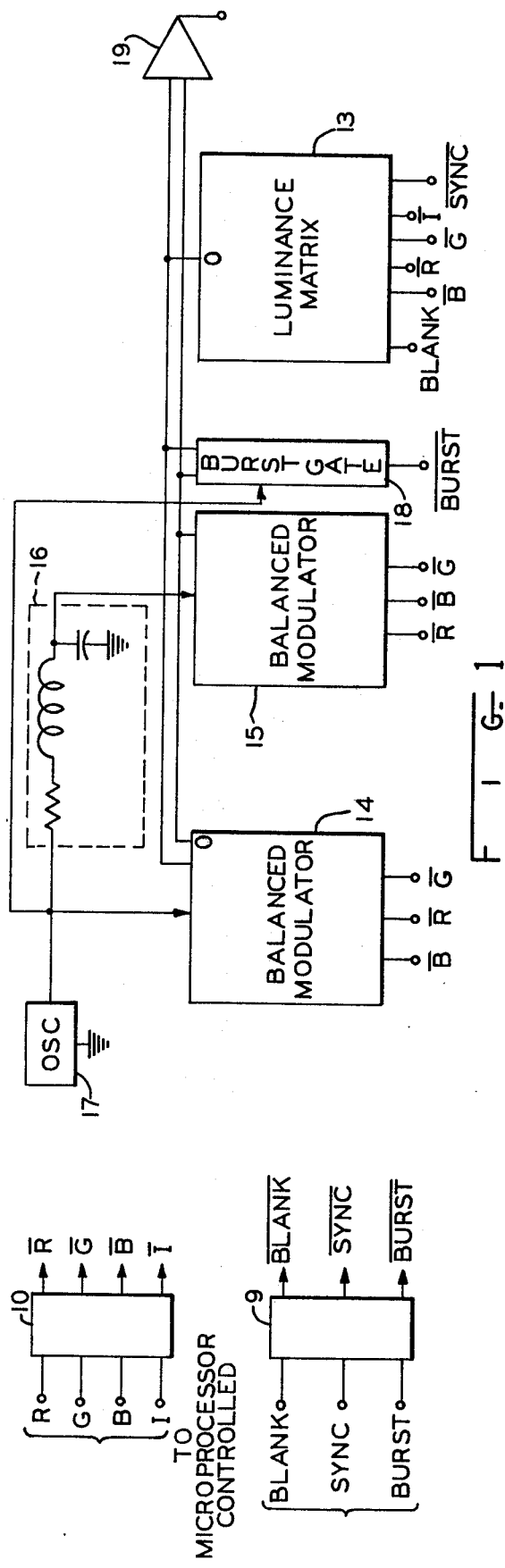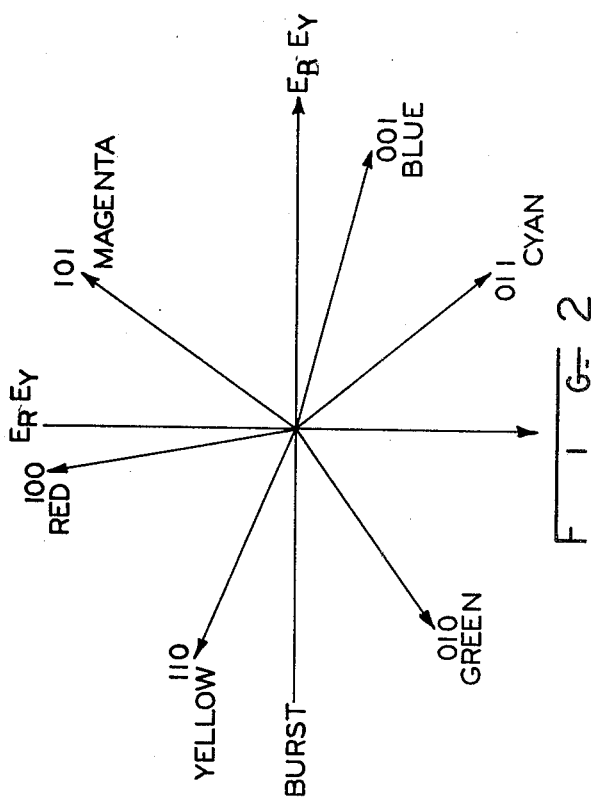

APPARATUS FOR CONVERTING DIGITAL DATA INTO A VIDEO SIGNAL FOR DISPLAYING CHARACTERS ON A TELEVISION RECEIVER

BACKGROUND OF THE INVENTION

This invention relates to the television art. Specifically, an interface between a digital microprocessor and a standard NTSC television receiver or monitor is provided for converting binary signals representing a picture to be displayed into a standard NTSC composite video signal.

Since the invention of video games various apparatus have been produced to supply signals to a television receiver for displaying objects on the television receiver. The objects interact and are controlled by individual participants to play a game. Recent video game apparatus has taken advantage of microprocessor systems which enable more complex games to be produced. Data specifying the configuration and location of game objects on a television receiver is manipulated in a microprocessor system. The microprocessor system has a clock rate and a timing system which is related to the scan rate of an NTSC raster scan television receiver. The microprocessor system supplies digital signals indicating the occurrence of synchronization pulses, blanking intervals and a burst signal for establishing a color reference and also provides digital data indicating the color and brightness of each scanned raster on a television receiver. These microprocessor systems are described in a paper given at the 1976 WESCON Professional Program by Kam Li, Kenneth D. Liston, John F. Sluzarski and E. D. Hill as well as in other references.

The microprocessor system requires a digital/video interface for generating a composite video signal from digital words specifying picture detail. The present invention provides such an interface. The output signal from the interface is applied directly to a video monitor for displaying game characters and objects, or the output signal may be used to modulate an RF carrier having a frequency corresponding to the frequency of a broadcast television channel. The modulated signal may then be applied to the antenna terminals of a standard television receiver for viewing game objects.

SUMMARY OF THE INVENTION

It is an object of this invention to provide a composite video signal in response to a binary word produced by digital apparatus.

It is a more specific object of this invention to provide a composite video signal for generating characters to be displayed on a standard NTSC television monitor from the digital output of a microprocessor controlled video game.

These and other objects are accomplished by the invention described herein. Digital data from a digital apparatus such as a microprocessor controlled video game specifying the color and brightness of a picture detail to be displayed on a raster scan television receiver is converted into a line by line standard NTSC video signal. Blanking pulses, synchronization pulses and color burst are combined with the color and brightness components of the video signal when the digital apparatus specifies the proper time for adding this information to the video signal thereby forming a composite video signal. The video signal when supplied to a television monitor will cause the picture detail to be displayed on a television monitor.

In one embodiment of the invention 3 bits of a binary word are provided by a digital apparatus to specify the red, green and blue components of a picture detail to be displayed. The three bits of information are combined in a matrix network to produce a luminance signal representing the brightness level of the picture detail to be displayed. A fourth bit, the I bit, is provided to give an alternate luminance level for a given hue. The three bits also control the phase and magnitude of a 3.58 mHz signal which constitutes a chroma signal and the chroma signal is combined with the luminance signal. Added with the combined luminance and chroma signals are blanking signals, synchronization signals, and a chroma burst signal produced in accordance with three more bits of information supplied by the digital apparatus.

DESCRIPTION OF THE FIGURES

FIG. 1 is a block diagram illustrating a preferred embodiment of the invention.

FIG. 2 is a vector diagram showing the relationship of the chroma signal produced by the apparatus of FIG. 1 and the output of each balanced modulator.

DESCRIPTION OF THE PREFERRED EMBODIMENT

Figure 3:
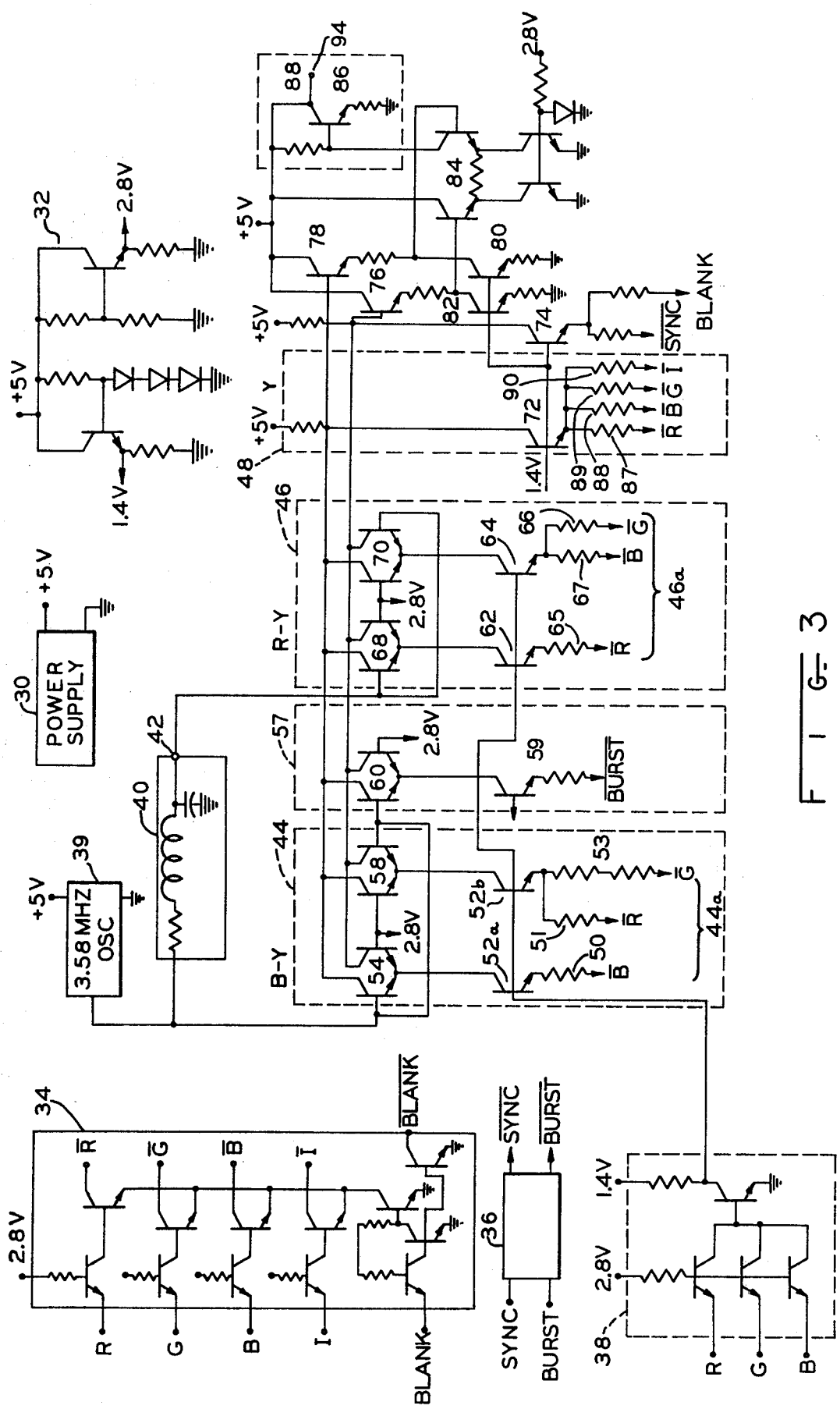
FIG. 3 is a schematic representation of a circuit for realizing the apparatus of FIG. 1.

Referring to FIG. 1, there is shown a block diagram of an apparatus for converting the digital output signal of a microprocessor controlled game or other digital apparatus into a video signal which will produce a color image on a TV monitor. The video signal from the apparatus may be used to modulate an RF carrier having a frequency corresponding to a television channel frequency. The modulated carrier when supplied to a television receiver will cause objects which are described by the microprocessor game to be displayed on a conventional NTSC television receiver.

The data available from the microprocessor controlled game includes digital information for specifying picture color, luminance level, a vertical blanking interval, horizontal blanking interval, synchronization intervals, and a burst flag indication. Those skilled in the video circuitry art will appreciate that this information constitutes the entire content of a video signal for displaying a color picture. The rate at which the data specifying these parameters changes is controlled by the microprocessor game thereby controlling picture resolution. The blanking information, synchronization information and burst information occur at periodic intervals during the production of a composite picture. Horizontal blanking occurs every $1/f_h$ seconds, vertical blanking occurs after every field has been scanned, and the burst flag signal will occur everytime a new line is to be scanned. During scanning the microprocessor will supply color and brightness information for each line scanned.

The digital bits representing these quantities are applied to the inputs of buffer circuits 9 and 10. The R, G, B and I bits of information are used to establish a luminance signal representing the luminance level as well as a chroma signal. The luminance signal and chroma signal when combined describe the color and brightness of a line being presently scanned on a raster scan television receiver. The luminance level is a function of the red, green and blue color content of a picture segment being presently transmitted and the state of the I bit. The fundamental equation known to those skilled in the video circuit art for deriving the luminance level represented by a voltage is as follows:

$$EY = 0.59Eg + 0.11Eb + 0.3Er + Ei$$

These parameters indicate the relationship between a voltage level representing the brightness of a given picture detail with respect to a voltage representing the color components of that given picture detail. A matrix 13 is used to perform the above algorithm to provide a luminance voltage in accordance with data indicating the amount of red, green or blue color in a picture detail.

Also included with matrix 13 is an input for changing the relative luminance level by supplying another bit, I, from the microprocessor. In some applications it may be desirable to alter the luminance voltage level by some weighting factor. The additional I input provides for such a weighting or change of the luminance level without changing the data indicating the color of a particular detail being displayed. Alternatively I could be used to change the color hue by connecting it to the balanced modulator.

The component of the video signal describing the color of a particular detail to be displayed is supplied from two balanced modulators 14 and 15 as a differential signal. Color information is indicated in a video signal by the particular phase and amplitude of a 3.58 mHz signal contained within the video signal. As the phase of the signal is caused to change, the color hue also changes. A 3.58 mHz oscillator 17 supplies a signal to the first balanced modulator 14 and supplies a signal to phase shifter 16. Phase shifter 16 supplies a 90° shifted 3.58 mHz signal to balanced modulator 15. The outputs of the balanced modulators are combined whereby the combined 3.58 mHz signal is controlled in amplitude and phase by selectively controlling the amount of signal provided by each balanced modulator 14 and 15.

Referring now to FIG. 2, the phase relationship of a 3.58 mHz signal contained in the video output signal with respect to the hue of a given color is represented by that signal. FIG. 2 indicates that hue is changed by altering the magnitude of the signal supplied by one balanced modulator with respect to the other balanced modulator. The table below indicates the relationship between hue and a given input signal on the R, G and B data lines.

| Code RGB | Er-Ey (mv) | Eb-Ey (mv) | Color | Φ Angle |
|---|---|---|---|---|
| 110 | −395 | +51 | yellow | 167 |
| 100 | −91.2 | +221 | red | 103 |
| 001 | +395 | −51.1 | blue | 347 |
| 010 | −197 | −198 | green | 241 |
| 011 | 91.3 | −221 | cyan | 283 |
| 101 | 196 | +198 | magenta | 61 |

The phase angle between the signals provided by the phase modulators is determined according to the following equation:

$$\angle \tan \theta = Er - Ey/0.56(Eb - Ey)$$

The Er minus Ey signal is defined as follows:

$$Er - Ey = 0.70Er - 0.59Eg - 0.11Eb$$

and the Eb−Ey signal is defined by the following:

$$Eb - Ey = 0.89Eb - 0.59Eg - 0.30Er.$$

The signals produced by the modulators are combined to form a chroma signal. The chroma signal is added to the luminance signal to constitute a full description of the picture detail contained within a video signal. The chroma signal and luminance signal are restrained from interacting by the use of differential output signals. The use of differential output signals for supplying a chroma signal allows for changes in the chroma signal to occur without altering the luminance level. Chroma signal levels are determined by the voltage differential at the inputs of amplifier 19 whereas the luminance level is determined by the d.c. voltage on one input to amplifier 19.

Also shown in FIG. 1 is a burst gate 18 for supplying a burst of 3.58 mHz signal when the microprocessor controlled game indicates a burst pulse is to be added to the video signal. The burst pulse is present in video signals having an NTSC format to provide a reference phase for the television receiver. The burst signal is used to establish a reference phase for an oscillator internal to the television receiver. The generated chroma signals contained in received video signals are compared with this reference phase and the color of a picture detail is produced according to the phase angle between the chroma signal with respect to the receiver internal oscillator signal.

The blanking and synchronization pulses are added to the video signal by altering the luminance level at a time specified by the microprocessor controlled game. The microprocessor controlled game provides data indicating that a blanking interval or a synchronization interval is occuring. This data indicates that a complete line of picture information has been produced, or that a complete field of picture information has been produced, and the beam on the television picture tube is cut off for a specified time. Synchronization pulses are added to the composite video signal in response to this data. The luminance matrix 13 has inputs for selectively reducing the luminance level to a black level when data is received indicating a synchronization pulse or blanking pulse is to be produced.

An intensity bit is provided by the microprocessor controlled game indicating another luminance level for a given picture detail. This bit is also inverted by the inverter-driver circuit 10 and applied to the luminance matrix 13. The luminance matrix 13 can alter the luminance level in response to an intensity bit to give a different brightness level for a given scene. This additional bit of information does not alter the hue of the color but merely provides another luminance level for the same color.

The luminance signal with synchronization and blanking information is combined with the chroma signal by an amplifier 19 to form a single ended source of composite video signals. The signal provided by ampllifier 19 may directly drive a standard television monitor, or may be used to modulate an RF signal source for supplying the antenna terminals of a television receiver with a signal which may be decoded and displayed on a conventional television receiver.

A specific embodiment of the apparatus shown in FIG. 1 is shown in FIG. 3. Data from the microprocessor controlled game enters two inverter-driver circuits 34, 36. Inverter-driver circuit 34 receives four bits of digital information specifying red, green, blue and an intensity bit for the picture detail to be displayed. Inverter 34 also receives a bit for indicating a blanking interval. When the microprocessor indicates that a blanking interval is to begin, the output terminals of inverter-driver circuit 34 are held in a logic state indicating the luminance level is to be at the black level thereby causing no trace to be made on the CRT. Similarly, inverter-driver circuit 36 receives data indicating a synchronization pulse is to be transmitted and a burst pulse is to be transmitted. The output of inverter-driver 36 comprises an inverted signal indicating the presence or absence of a synchronization pulse or a burst pulse.

The apparatus of FIG. 3 requires a master five volt power supply 30 for providing voltage to the circuit. A voltage divider 32 provides separate bias voltages of 1.4 volts and 2.8 volts for use by the circuit of FIG. 3. These bias voltages are applied where indicated on the circuit diagram.

Additionally, there is a circuit 38 for indicating when the R, G and B data bits are simultaneously 1, 1, 1. This circuit 38 will provide a separate color bias signal to the modulators 44 and 46 in a manner to be explained. The circuit 38 will cause white to be displayed in lieu of the color normally generated when $R=G=B$. This "normal" color is regarded as objectionable to a viewer.

A 3.58 mHz oscillator 39 is supplied with 5 volts d.c. to provide a 3.58 mHz signal to modulators 44 and phase shift network 40. Phase shift network 40 shifts the phase of the oscillator signal. The modulators 44, 46 are supplied with a pair of 3.58 mHz signals 90° apart.

The inverted signals $\bar{R}$, $\bar{G}$ and $\bar{B}$ are supplied to inputs 44a and 46a of the modulator circuits 44, 46. Modulator 44 comprises two current sources 52 driving two pairs of transistors 54 and 58. The 3.58 mHz signal is applied to the base of one transistor in each transistor pair 54, 58. The remaining bases of the transistor pair are connected together and returned to the 2.8 volt bias voltage supply. By varying the amount of current supplied to the emitters of each pair, the magnitude of the signal appearing at the collectors of each transistor pair may be varied. The collectors of each transistor pair provide differential signals of 3.58 mHz frequency. As the current through a transistor pair increases, the differential signal produced at the collectors of each transistor pair increases as well. The $Eb-Ey$ signal must have the following format:

$$Eb-Ey=0.89Eb-0.59Eg-0.30Er$$

The current provided by transistors 52a and 52b is a function of the current provided by resistors 50, 51 and 53 to the emitters of the respective transistors 52a, 52b and a source of voltage. Therefore, those skilled in the art will recognize that the output signal from modulator 44 may be controlled according to the above equation by selecting the value of resistors 50, 51 and 53. Alternately changing the $\bar{B}$, $\bar{R}$ and $\bar{G}$ voltage levels applied to resistors 50, 51 and 53 will cause $Eb-Ey$ to change in amplitude.

Modulator 46 similarly employs two transistor pairs 68 and 70 driven by two current sources 62 and 64. Each current source 62, 64 controls the amount of 3.58 mHz signal which appears at the collectors of the transistor pairs 68, 70. The $Er-Ey$ signal is defined as:

$$Er-Ey=0.70Er-0.59Eg-0.11Eb$$

By properly selecting the value of the resistors 65, 66 and 67 the signals produced by the transistor pairs 68, 70 may be controlled according to the above equation. The bases of the current sources in each modulator are connected to the output of circuit 38. Circuit 38 will provide 1.4 volts of bias voltage to each of these current sources within modulators 44 and 46. When circuit 38 indicates that $R=G=B$, the current provided by the respective current sources within modulators 44 and 46 will be established at some known value to produce white in lieu of the color normally specified by $R=B=G$.

The differential outputs of modulators 44 and 46 are combined by transistors 84 to produce a single ended voltage. Because the two signals are out of phase, transistors 84 effectively combine them algebraically to produce twice the individual voltage. Transistors 78 and 76 provide current gain to the differential signals for driving transistors 84. Transistors 82 and 80 shift the voltage level of the signal provided by transistors 76 and 78. The luminance level is added to one of the differential chroma signals by Y matrix 48. Y matrix 48 comprises a current source having multiple inputs. Transistor 72 has an emitter terminated in resistor 87, resistor 88, resistor 89 and resistor 90. These resistors will provide a current through the collector of transistor 72, when coupled to a source of voltage. The amount of current supplied by the collector of transistor 72 is proportional to the resistor value selected for each of the resistors terminating the emitter of transistor 72. The luminance voltage level Ey is described by the following equation:

$$Ey=0.30Er+0.59Eg-0.11Eb$$

This luminance signal provided by the collector of transistor 72 is added to one of the differential chroma signals supplied by modulators 44 and 46. The luminance voltage level provided by matrix 48 will not alter the hue information contained in the chroma signal, and the hue signal will not alter the luminance signal.

A burst signal is added to the composite video signal by means of a burst gate 57. The burst gate 57 comprises a pair of transistors 60 connected to the 3.58 mHz oscillator 39. The burst gate 57 will provide a 3.58 mHz signal when current source 59 is enabled. The enabling of current source 59 occurs when the microprocessor indicates that a burst signal is to be commenced. This causes the burst flag voltage to be at 0 volts. The presence of a logic 1 signal at the burst input of gate 36 will cause the pair of transistors 61 to provide a 3.58 mHz signal.

The synchronization and blanking pulses are added to the composite video signal by transistor 74. When an indication from the microprocessor is received by inverter-driver circuit 36 indicating that a synchronization pulse is to occur, transistor 74 is enabled causing transistor 76 to reduce the luminance voltage below a black level voltage.

The composite video signal containing chroma, luminance, blanking, synchronization and burst information is amplified by amplifier 86 and provided to terminal 88. The signal appearing at terminal 94 is fed directly to a video monitor, or may be applied to a modulator-RF source combination for providing a signal within the passband of a standard NTSC receiver.

Thus there has been described an apparatus for providing a composite video signal in response to the commands of the digital processor. Those skilled in the art will recognize other embodiments of this invention as defined by the claims which follow.

Those skilled in the art will recognize that it is possible to provide many signals similar to $\overline{R}$, $\overline{G}$, and $\overline{B}$ to modulators 44 and 46 to provide more hue information. Similarly many more inputs could be provided to matrix 48 to provide additional luminance information. Also, it will be noted that the source of the signals applied to 44, 46 and 48 could be any form of open collector (open drain) logic. For example, $\overline{R}$, $\overline{B}$, $\overline{G}$, $\overline{I}$ could have been derived from a PLA structure which will generate the proper signals from an arbitrary set of digital inputs to the device.

What is claimed is:

1. Apparatus for generating a video signal in a standard NTSC format from a digital signal source, said source providing a first group of binary words for indicating the red, green and blue signal components of a picture detail, and a second group of binary words for indicating the occurrence of a horizontal synchronization interval, vertical synchronization interval, a blanking interval, and a burst signal, comprising:
   (a) matrix means for converting said first group of binary words representing the red, green and blue components of said picture detail into a d.c. voltage, said d.c. voltage representing the luminance level of said picture detail;
   (b) a signal source for providing first and second signals at 3.58 mHz, said signals having a phase difference of 90°;
   (c) a first balanced modulator for receiving said first signal, said modulator having an output signal determined by said first group of binary words;
   (d) a second balanced modulator for receiving said second signal and controlling the magnitude of said second signal, said balanced modulator providing a signal having a magnitude proportionally controlled by said first group of binary words;
   (e) means for modifying said luminance signal when said digital signal source indicates a synchronization signal or a blanking signal are to occur; and
   (f) means for combining the output of said modulators and said matrix whereby a video signal is produced specifying the brightness and color of said picture detail in accordance with an NTSC format.

2. A digital to video interface for converting digital data specifying the color and brightness level of a horizontal line into a video signal for display on a video monitor comprising:
   (a) a source of digital data for specifying the red, blue and green components of a horizontally scanned line;
   (b) matrix means for converting data representing said red, blue and green components into a d.c. voltage level, said d.c. voltage level representing a luminance signal for said line;
   (c) a source of 3.58 mHz signal, said source providing first and second signals having a phase difference of 90°;
   (d) a first balanced modulator for receiving said first signal, said balanced modulator providing a differential output signal having a magnitude controllable by said digital data;
   (e) a second balanced modulator for receiving said second signal, said balanced modulator providing a differential output signal having a magnitude controllable by said digital data; and
   (f) means for combining said differential output signals with said luminance signal whereby a line of composite video signal is produced for specifying the color and brightness of a line of picture detail.

3. The apparatus of claim 2 further comprising means for adding a burst signal and horizontal synchronization signal to said line of composite video signals.

* * * * *